Jan. 20. 1925.　　　　　　　　　　　　　　　　1,523,556
G. J. NETH
HANDLE STOP
Filed Oct. 6, 1922　　　　2 Sheets-Sheet 1
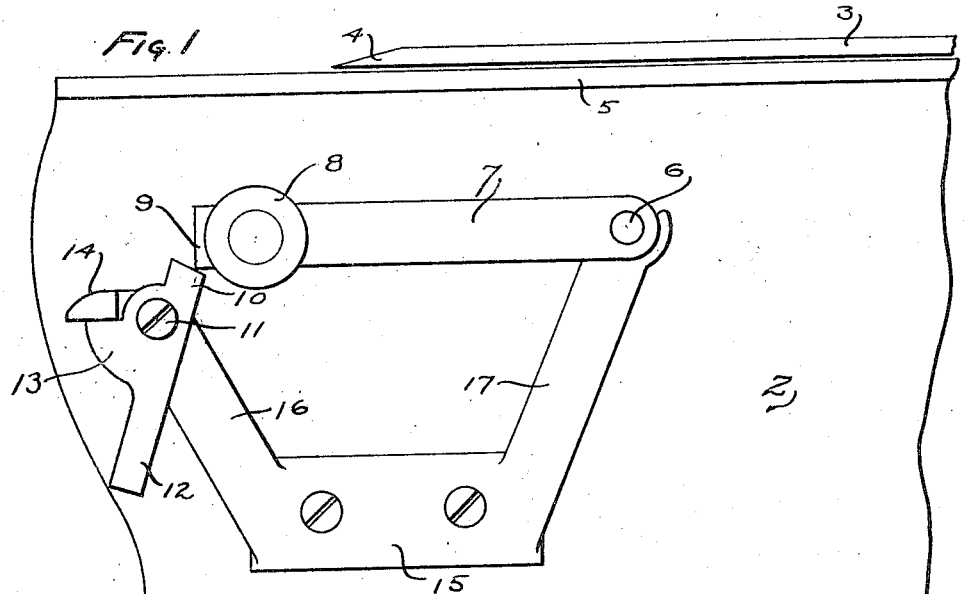
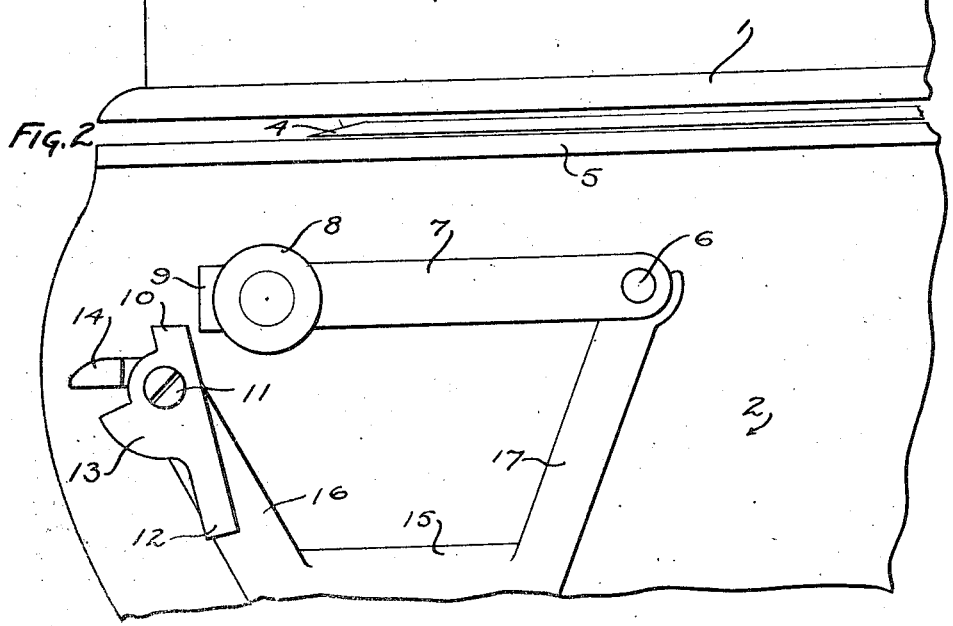
INVENTOR.
George J. Neth
BY
Toulmin & Toulmin
ATTORNEYS.

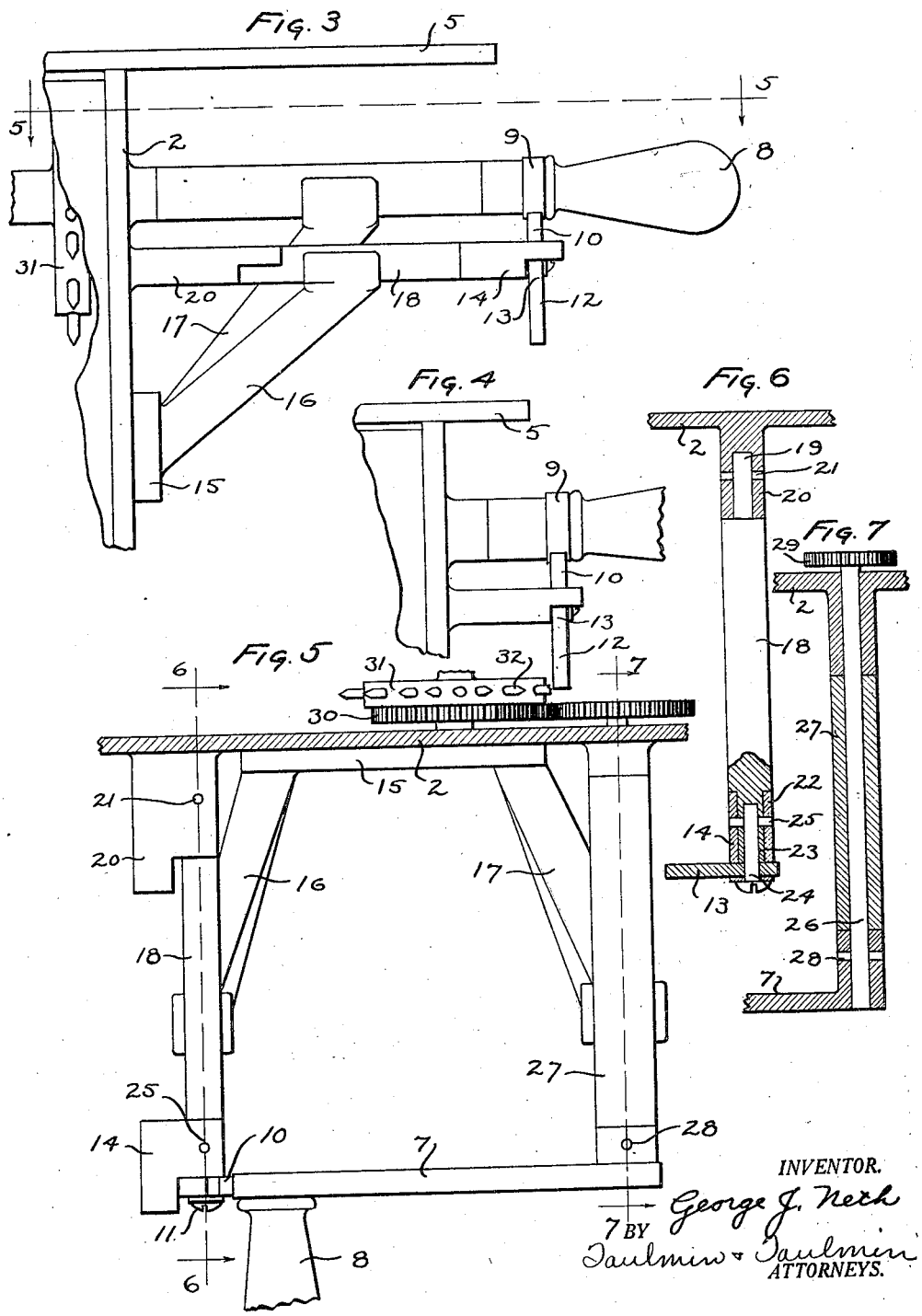

Patented Jan. 20, 1925.

1,523,556

UNITED STATES PATENT OFFICE.

GEORGE J. NETH, OF DAYTON, OHIO, ASSIGNOR TO THE EGRY REGISTER COMPANY, OF DAYTON, OHIO, A CORPORATION OF OHIO.

HANDLE STOP.

Application filed October 6, 1922. Serial No. 592,711.

*To all whom it may concern:*

Be it known that I, GEORGE J. NETH, a citizen of the United States, residing at Dayton, in the county of Montgomery and State of Ohio, have invented certain new and useful Improvements in Handle Stops, of which the following is a specification, reference being had therein to the accompanying drawing.

My invention relates to autographic registers and in particular to a handle stop for autographic registers.

The object of my invention is to provide a handle stop that will positively and definitely stop the handle after it has made one revolution in the course of ejecting the sheet or sheets upon which an autographic record has been made.

It is a further object to provide a stop which cannot be unlocked until one or more fingers are released from the handle which the hand of the operator is grasping, thus bringing to an appreciable stop the entire mechanism, and preventing an overthrow of the autographic sheets or a delivery of more than one set of the sheets at a time.

It is an additional object to provide a handle stop which will restore itself automatically to its operative position after having been moved to its inoperative position to permit the handle to pass by.

It is a further object to provide such a handle stop which may be thus moved to an inoperative position by the finger or fingers of the operator without completely removing the hand of the operator from the operating handle.

It is an additional object of my invention to provide means to extend the standard construction of the handle stop in a simple and easily manufactured way to accommodate different widths of covers of the autographic register, so that it will not be necessary to have a complete new set of parts of handles and stops for different registers having different widths.

It is a further object of my invention to provide means of holding the several paper sheets in definite position by means of my new handle stop so that they may be torn off against the cutting edge of the cover without the necessity of providing any other means of holding the sheets.

Referring to the drawings—

Fig. 1 is a side elevation of the handle in its stopped position.

Fig. 2 is a side elevation of the handle just about to start on a revolution.

Fig. 3 is an elevation of the handle in its stopped position where the handle and its stop is employed with the extension members on a register having a very broad cover.

Fig. 4 is an elevation of an operation of the handle stop in position as applied to a register having a narrow cover.

Fig. 5 is a plan view partially in section of the extension members, the stop and the handle, the stop and handle being in a stopped position. Fig. 5 is a section on the line 5—5 of Fig. 3.

Fig. 6 is a section on the line 6—6 of Fig. 5.

Fig. 7 is a section on the line 7—7 of Fig. 5.

Referring to the drawings in detail:

1 is a base of a register, 2 a side wall therefor, and 3 a cover which has a cutting edge 4 and an extension 5.

This register is provided with a main operating shaft 6 upon which is mounted a lever or crank 7 having a handle 8. 7 projects at 9 beyond 8. 9 is adapted to come in contact with the head 10 of the stop, which is pivoted at 11 to the side of the register. This stop is so weighted that it will assume the position shown in Fig. 1 of its own accord. It is pivoted at its lower end with a finger 12 and a stop 13, which butts against the projection 14.

14 is not only provided to locate 10 in position but also to prevent a finger of the operator passing directly down upon 13 or upon 12 and prematurely moving 10 out of the path of 9. By interposing 14 it forces the operator to release at least one and possibly two fingers, thus releasing the grip upon 8. These one or two fingers are used to pass over 14 towards the front of the register and then down to make contact with 12 to move 10 out of the path of 9 before another revolution can be made with 7 and another set of slips can be ejected, thus eliminating the error and waste due to an overthrow by the handle but not slowing up the speed of the operation of the register.

Heretofore it has either been necessary to move 8 transversely of 7 to unlock 7 or it has been necessary to shift 8 on the longitudinal axis of 7. In the present instance 8 is not disturbed on 7 and is not lost accordingly, but 9 is momentarily stopped together with 7 and 8 until the sheets can be torn off, and thereupon 10 can be moved out of the path of 9 by the application of the fingers to 12. The fingers on the hand operating 7, 8, and 9 are used for this purpose without fully releasing the hand from 8 or changing its position substantially.

In the case of a cover being extra broad as in Fig. 3, extensions are provided with extension brackets to permit of the use of the same handles and same stops on all types of registers.

For this purpose a bracket 15 with a pair of arms 16 and 17 respectively supporting the support for the stop and the support for the handle.

In order to effect this extension for the handle stop, a member 18 is provided which has a restrictive operation 19 to project to the cut away operation 20 in the side wall of the machine. 19 is pinned by the pin 21 to the side wall of the machine. The outer end of 18 is restricted in size and has mounted thereon a collar 22. Then the restricted end 23 is mounted to a retaining member 24 which retains the stop. 24 and 22 are pinned by the pin 25 to 23.

The extension for the operating handle is provided as follows: An extra long operating shaft 26 is provided upon which is mounted a sleeve 27 to turn loosely thereon to act as a spacer between the side of the register and the handle 7, to which 26 is pinned by the pin 28.

The gear 29 is mounted upon 6 or upon 26 and meshed with another gear 30 in the register, which in turn operates a pin wheel 31 having the pins 32, which are inserted into the perforations, located in the margin of the sheets of paper designated 33.

It will be apparent that when the handle is brought to a full stop and maintained in that position by the contact of 9 with 10 that the paper cannot be moved and therefore when pulled against the cutting edge 4, it may be torn off without disturbing the remainder of the sheets and without pulling them out of the machine.

It will be understood that I comprehend within my invention suitable modifications and adaptations of the invention to various registers and for various purposes.

Having thus fully described my invention, what I claim as new and desire to secure by Letters Patent, is:—

1. In an autographic register, an operating handle, a pivoted stop normally in the path of said handle, said stop and handle being so arranged that said stop may be moved out of the path of the handle by a finger of the operator's hand operating the handle without removing the hand from the handle and without moving the hand from the direction of motion when moving the handle.

2. In an autographic register, an operating handle, a pivoted stop normally in the path of said handle, said stop and handle being so arranged that said stop may be moved out of the path of the handle by a finger of the operator's hand, operating the handle without removing the hand from the handle, and means to prevent the finger of the operator from coming directly in contact with the stop prior to the contact of the handle with the stop.

3. In an autographic register, an operating handle, a pivoted balanced stop normally in the path of said handle, said stop and handle being so arranged that said stop may be moved out of the path of the handle by a finger of the operator's hand operating the handle without removing the hand from the handle, said stop being so arranged that under the effect of gravity it will assume its position in the path of the handle to stop it.

4. In an autographic register, an operating handle, a pivoted balanced stop normally in the path of said handle, said stop and handle being so arranged that said stop may be moved out of the path of the handle by a finger of the operator's hand, operating the handle without removing the hand from the handle, and means to prevent the finger of the operator from coming directly in contact with the stop prior to the contact of the handle with the stop, said stop being so arranged that under the effect of gravity it will assume its position in the path of the handle to stop it.

5. In an autographic register, the combination of a handle, said handle adapted to engage with a stop on one side of the pivotable location of the stop, a stop pivotably mounted on the register, and means on the other side of the pivotable location of the stop for limiting its motion in one direction the parts being so arranged that the stop cannot be removed until the hand of the operator moves the stop to one side.

6. In an autographic register, the combination of a handle, said handle adapted to engage with a stop on one side of the pivotable location of the stop, a stop pivotably mounted on the register, and means on the other side of the pivotable location of the stop for limiting its motion in one direction, and means on said pivotable stop to be operated by the operator to move it in the other direction to permit the handle to pass by the parts being so arranged that the stop cannot be removed until the hand of the operator moves the stop to one side.

7. In an autographic register, the combination of a handle, said handle adapted to engage with a stop on one side of the pivotable location of the stop, a stop pivotably mounted on the register, and means on the other side of the pivotable location of the stop for limiting its motion in one direction, means on said pivotable stop to be operated by the operator to move it in the other direction to permit the handle to pass by, and means on said stop to restore it to its obstructing position after the handle has passed by and it is released by the hand of the operator.

8. In an autographic register, a handle, a stop arranged in the path of the handle and pivotably mounted on the register, said stop adapted to be engaged by the handle to one side of the pivotable point, a stop on the other side of its pivotable point to maintain it in its obstucting position, a means to prevent the fingers of the operator moving the stop to its inoperative position prior to the contact of the handle with the stop without the fingers of the operator and the hand, of which the fingers are a part, releasing the handle entirely.

9. In combination in a autographic register, a handle thereon projecting laterally therefrom, a pivotable stop in the path of the handle adapted to engage with the handle at one side of its pivotable point, a shoulder on said pivotal stop adapted to engage with an abutment carried on the register to maintain the pivotal stop in its stopping position, said stop being so arranged as to normally engage with said abutment on the register and to be maintained in the stopping position through the effect of gravity thereon.

10. In combination in an autographic register, a handle thereon projecting laterally therefrom, a pivotable stop in the path of the handle adapted to engage with the handle at one side of its pivotable point, a shoulder on said stop adapted to engage with an abutment carried on the register to maintain it in its stopping position, said stop being so arranged as to normally engage with said abutment on the register and maintain itself in the stopping position through the effect of gravity thereon, and means on said abutment on the register to prevent the fingers of the operator operating the stop prior to the handle coming in contact therewith to move it out of the path of the handle unless the hand operating the handle substantially leaves the handle rendering it substantially stationary.

11. In combination in an autographic register adapted to actuate the plurality of sheets having marginal perforations a pin wheel mechanism for actuating said sheets by the pins on the pin wheel mechanism engaging with the perforations, a handle for operating said pin wheel mechanism, a stop pivotably mounted on said register in the path of said handle to positively stop it at each revolution, means to prevent said pivotably mounted stop from moving in one direction, and means thereon to permit the fingers of the operator to move it in the other direction, the point of contact of the handle and the stop being to one side of the pivotable point of mounting of said stop on the register, the parts being so arranged that the stop on the register may be moved out of the path of the handle after positively stopping same by the hand of the operator, which is used to turn the handle.

12. In combination in an autographic register adapted to actuate a plurality of sheets having marginal perforations, a pin wheel on either side of said register for actuating said sheets by the pins on the pin wheels engaging with the perforations, a handle for operating said pin wheels, a stop pivotably mounted on said register in the path of said handle to positively stop it at each revolution, means to prevent said pivotably mounted stop from moving in one direction, and means thereon to permit the fingers of the operator to move it in the other direction, the point of contact of the handle and the stop thereon being to one side of the pivotable point of the mounting of the stop on the register, the parts being so arranged that the stop on the register may be moved out of the path of the handle after positively stopping the same by the hand of the operator, which is used to turn the handle, the stop on said register being so constructed that it will remain in its stopping position through the effect of gravity unless positively moved into its inoperative position.

13. In combination of an autographic register adapted to actuate the plurality of sheets having marginal perforations, a pin wheel on either side of said register for actuating said sheets by the pins on the pin wheels engaging with the perforations, a handle for operating said pin wheels, a stop pivotably mounted on said register in the path of said handle to positively stop it at each revolution, means to prevent said pivotably mounted stop from moving in one direction, and means thereon to permit the fingers of the operator to move it in the other direction, the point of contact of the handle and the stop being to one side of the pivotable point of the mounting of the stop on the register, the parts being so arranged that the stop on the register may be moved out of the path of the handle after positively stopping the same by the hand of the operator, which is used to turn the handle, said stop being so constructed that it will remain in its stopping position through the effect of gravity unless positively moved into its inoperative position, and a cutting edge against which the ejected paper strips may be torn off when the handle is so stopped.

14. In an autographic register, the combination of an operating handle, a pivotable stop to stop said handle, the point of contact being on one side of the pivotable point and means to prevent the pivotable stop from moving in one direction, said stop being so arranged as to normally maintain its stopping position due to the effect of gravity thereon, a supporting bracket for said stop and said handle, a shaft to be operated by said handle supported by said bracket and connected to said handle with a spacer sleeve thereon, another portion of the supporting bracket supporting an extension member for the stop, said extension member being connected to the side wall of the register at one end and its other end supporting the stop pivotably, and means to prevent the movement of the stop in one direction, said handle and stop being adapted to be used with the register without modifications with or without the extension members and the supporting bracket to accommodate for varied widths of register covers.

In testimony whereof, I affix my signature.

GEORGE J. NETH.